United States Patent
Paine et al.

(10) Patent No.: US 6,332,148 B1
(45) Date of Patent: Dec. 18, 2001

(54) APPEARANCE AND POSITIONING ANNOTATION TEXT STRING AND BASE TEXT STRING SPECIFYING A RULE THAT RELATES THE FORMATTING ANNOTATION, BASE TEXT CHARACTERS

(75) Inventors: Mark A. Paine, San Francisco; Jeff Young, San Jose, both of CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 08/865,661

(22) Filed: May 30, 1997

Related U.S. Application Data (63) Continuation of application No. 08/829,317, filed on Mar. 31, 1997, now abandoned.

(51) Int. Cl.[7] ................................................. G06F 17/30
(52) U.S. Cl. ........................ 707/512; 707/517; 707/523; 707/529; 707/530
(58) Field of Search ............................. 707/512, 523, 707/529–531, 511, 513, 515–520, 541–542, 526; 704/2, 5, 8; 345/116, 113, 340, 336, 342, 347

(56) References Cited

U.S. PATENT DOCUMENTS

| | | | | |
|---|---|---|---|---|
| 5,146,552 | * | 9/1992 | Cassoria et al. | 707/512 |
| 5,475,805 | * | 12/1995 | Murata | 707/513 |
| 5,581,682 | * | 12/1996 | Anderson et al. | 707/530 |
| 5,689,717 | * | 11/1997 | Pritt | 707/512 |
| 5,832,474 | * | 11/1998 | Lopresti et al. | 707/2 |
| 5,857,212 | * | 1/1999 | Van De Vanter | 707/519 |
| 5,873,111 | * | 2/1999 | Edberg | 707/536 |
| 5,893,125 | * | 4/1999 | Shostak | 707/511 |
| 6,128,632 | * | 10/2000 | McCully | 707/512 |
| 6,230,169 | * | 5/2001 | Nagae | 707/512 |

OTHER PUBLICATIONS

Microsoft Word 97, Help File for "Adding Furigana to Characters", © 1983–97 Microsoft One Page (1).

Ichitaro 8/R.1 for Win 95/NT, Help Files for "Editing Ruby", © Just Systems 1997 pp. 2 and 3 only.

* cited by examiner

*Primary Examiner*—Jack Choules
*Assistant Examiner*—Srirama Channavajjala
(74) *Attorney, Agent, or Firm*—Fish & Richardson P.C.

(57) ABSTRACT

A computer-implemented method to embellish text in a document by setting composite text properties for formatting an annotation text string and a base text string in a composite text unit, selecting text in a displayed text document as the base text string for a composite text unit, generating text as an annotation text string for the composite text unit, and displaying the composite text unit in the text document in accordance with the composite text properties.

35 Claims, 11 Drawing Sheets

This  is at a left tab

A right tab

A decimal tab

A centered tab

Fig. 10c this is the annotation text

This selection is not in the composite text area

Fig. 11a

This selection is in the | this is the annotation text
composite text | area

Fig. 11b

This selection is also in the | this is the annotation text
composite text | area

APPEARANCE AND POSITIONING ANNOTATION TEXT STRING AND BASE TEXT STRING SPECIFYING A RULE THAT RELATES THE FORMATTING ANNOTATION, BASE TEXT CHARACTERS

CROSS REFERENCE TO RELATED APPLICATION

This application is a continuation of Ser. No. 08/829,317, is abandoned filed Mar. 31, 1997.

BACKGROUND

The invention relates to composite text in a text document, the composite text including base text and associated annotation text to be printed along with the base text.

Text strings in documents are sometimes embellished with annotation text strings. Typically, secondary text characters in a document such as formatting symbols (such as underline and overstrike), phonetic diacritics, and special format conventions (such as superscripts for footnotes), are positioned with respect to a single character or spacing unit of the standard text.

In contrast, an annotation text string, identified as a unit, is positioned with respect to a base text string, also identified as a unit, in a document. Unlike formatting symbols and diacritics, characters of an annotation text string and characters of the base text string can be independently generated and edited. An example can be found in documents having standard text based on the Japanese kanji and kana character sets: annotation text (specifically, rubi text) is sometimes printed alongside base text (specifically, oyamoji text) to provide pronunciation information.

SUMMARY

In general, in one aspect, the invention features a computer-implemented method to embellish text in a document by setting composite text properties for formatting an annotation text string and a base text string in a composite text unit, selecting text in a displayed text document as the base text string for a composite text unit, generating text as an annotation text string for the composite text unit, and displaying the composite text unit in the text document in accordance with the composite text properties.

Certain implementations of the invention include one or more of the following features. The text selected for the base text string may be Japanese characters. The text of the annotation text string may provide, for example, pronunciation or semantic information for the text of the base text string.

Setting composite text properties may include determining a character set, a font, or a font size for the annotation text string. Additionally, setting composite text properties may include determining alignment options for the annotation text string with the base text string. Alignment options may include determining separate alignment options for a composite text unit occurring at a line boundary in the text document or determining an overhang option. Default options may be provided for the composite text properties to be set.

The composite text unit in the text document may be interactively displayed in accordance with the composite text properties as the text for the annotation text string is generated. The characters of the annotation text string may be displayed in a different font size than characters of the base text string, and may be displayed above or alongside the base text string.

The method of embellishing text in a document may further include editing the text of the composite text unit and displaying the edited composite text unit in the text document in accordance with the composite text properties. The edited composite text unit is interactively displayed as it is edited. Further, as the composite text unit is edited, the displayed composite text unit is emphasized by, for example, displaying a bounding box around the composite text unit.

Editing the text of the composite text unit includes, for example, reformatting at least a portion of the annotation text string. Reformatting may be performed by selecting a portion of the annotation text string and reformatting the selected portion of the annotation text string.

In general, in another aspect, the invention features a memory device storing computer-readable instructions for aiding a computer to embellish text in a text document by methods such as those described above.

In general, in another aspect, the invention features a computer-implemented method for editing a composite text unit in a document, the composite text unit including a base text string and an annotation text string. A text document, including the base text string and the annotation text string of a composite text unit, is displayed in accordance with predetermined composite text properties. A cursor is displayed at a position in the annotation text string of the composite text unit, based on user input, and the annotation text string at the cursor position may be edited in response to user input. The text document is displayed as the annotation text string is being edited.

Certain implementations of the invention include one or more of the following features. The cursor is freely movable within the composite text unit for editing the base text string and the annotation text string. The method may further include emphasizing a composite text unit when the cursor position is within the composite text unit, but not emphasizing the composite text unit when the cursor position is not within the composite text unit. The composite text unit is emphasized, for example, by highlighting or displaying a bounding box around the composite text unit.

Among the advantages of the invention are one or more of the following. The invention provides variable parameters for character set, font and font size of annotation text, and for alignment and spacing of the annotation text with respect to base text. The invention displays composite text as it will appear when rendered. Further, the invention displays the composite text in real time as it is created and edited. The invention enables direct editing of annotation text, and during editing, the invention distinguishes composite text from standard text in a document by emphasizing a composite text unit when the edit position is within the composite text unit.

Other features and advantages of the invention will become apparent from the following description and from the claims.

BRIEF DESCRIPTION OF THE DRAWINGS

FIG. 9b illustrates an internal representation of a the sentence of FIG. 9a.

DETAILED DESCRIPTION

Figure 1:
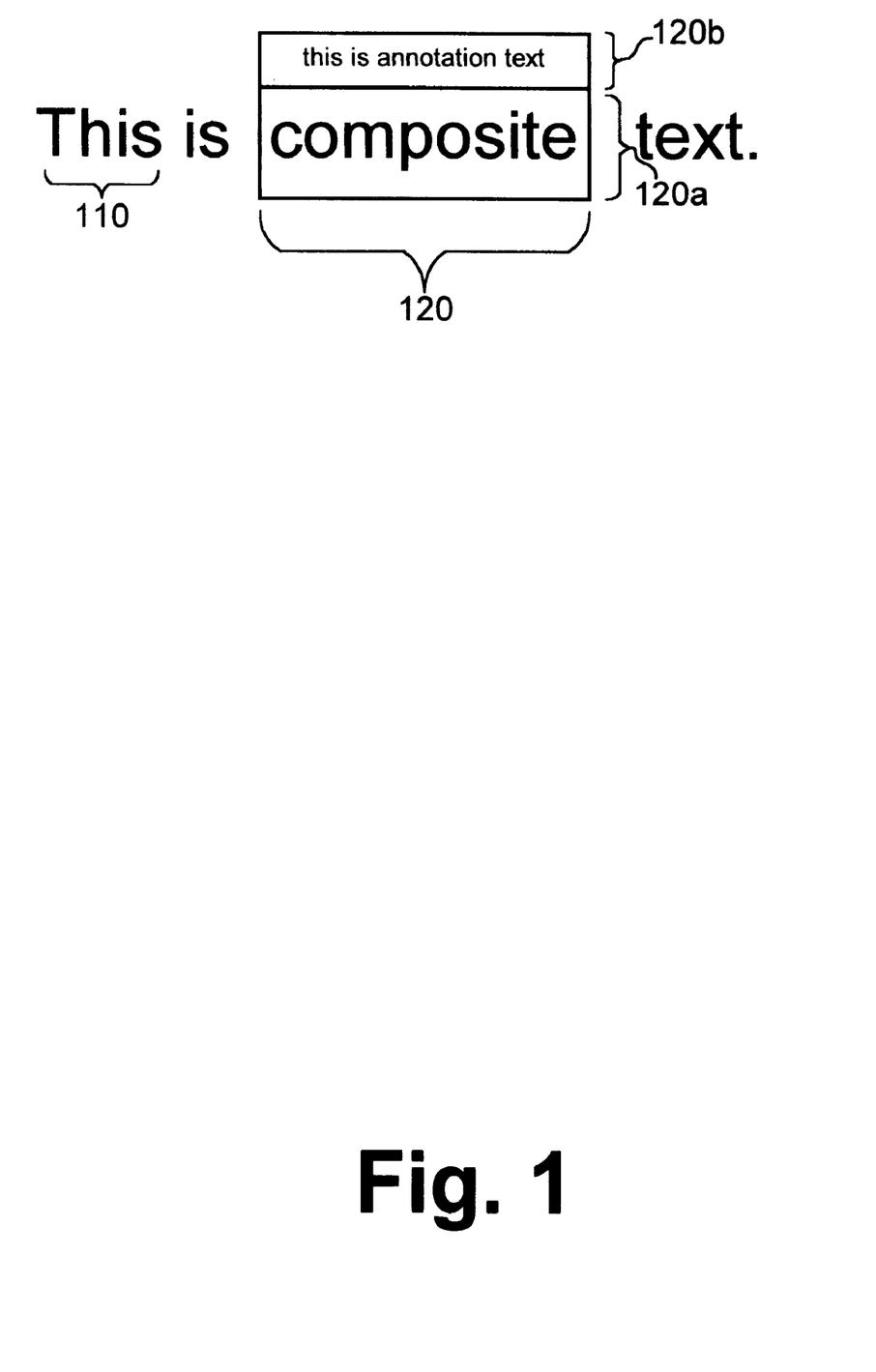
FIG. 1 shows a sentence in a document including a composite text unit.

FIG. 1 shows an example of a sentence in a document that can be created and edited using an interactive word processing program. As shown, the sentence includes both standard text (without annotation text) (such as word 110) and composite text (such as unit 120), which is a combination of base text 120a and associated annotation text 120b. Base text 120a of composite text unit 120 is formatted in the same way as is standard text 110, and can be generated from standard text.

Figure 2:
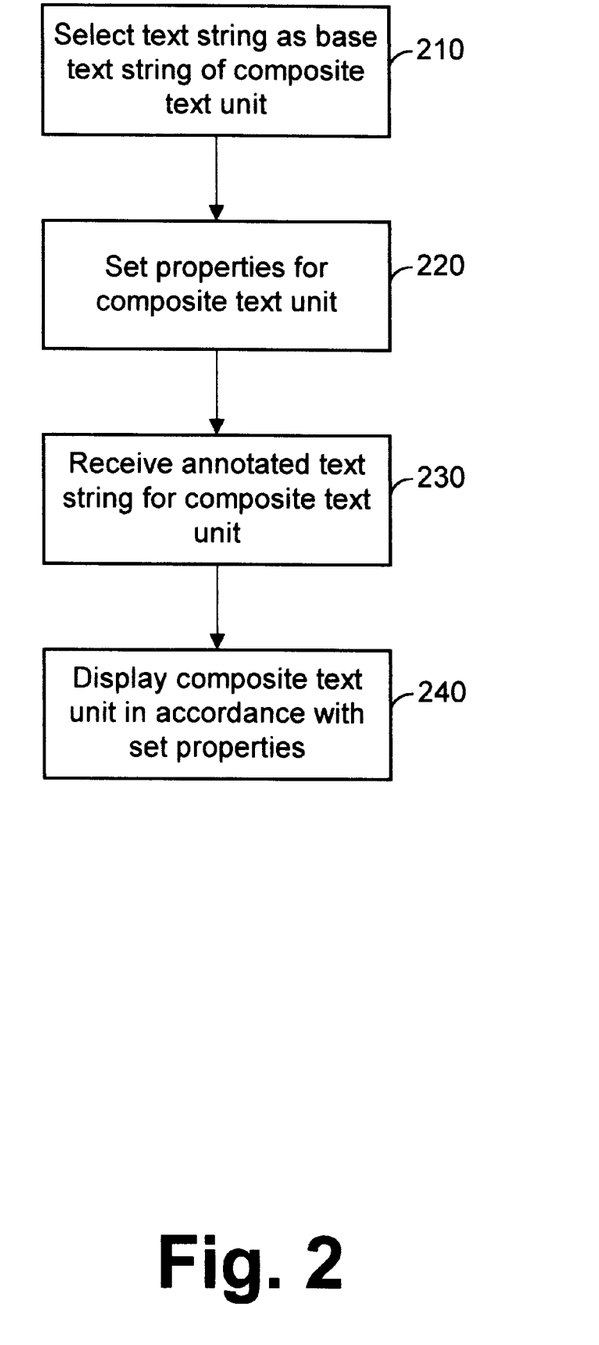
FIG. 2 shows a flow diagram for generating a composite text unit.

FIG. 2 describes a method for generating a composite text unit from a standard text string. A string of standard text is selected as the base text string of a composite text unit (step 210). An appropriate user interface can be provided to enable this designation.

In general, any string may be designated for a composite text unit, subject to application specific constraints. For example, guidelines set forth by a Japanese Industry Standard (JIS) for Japanese typography (annotation text of rubi text; base text of oyamoji text) require that a single composite text unit not extend beyond a single line when rendered. To comply with the JIS standard, therefore, text selection extending beyond a single line may be compressed to fit within a line or an appropriate warning or error dialog box may be displayed. Applications not having to comply with the JIS guidelines may be implemented to handle this situation as desired.

Step 220 sets the properties of the composite text unit. In some applications, once the composite text properties for a document are initially set by a user, those properties are applied in step 220 when composite text units are subsequently created in the document until the properties are specifically changed. Alternatively, an application may require the user to set the properties for the composite text unit each time a composite text unit is created. Some applications may apply predetermined default composite text properties until specifically changed by a user.

The composite text properties define the formatting of a composite text unit, affecting the appearance and positioning of the annotation and base text strings. Examples of such properties include character set (e.g., Roman, Arabic, Japanese), font, font size, and alignment.

Figure 3:
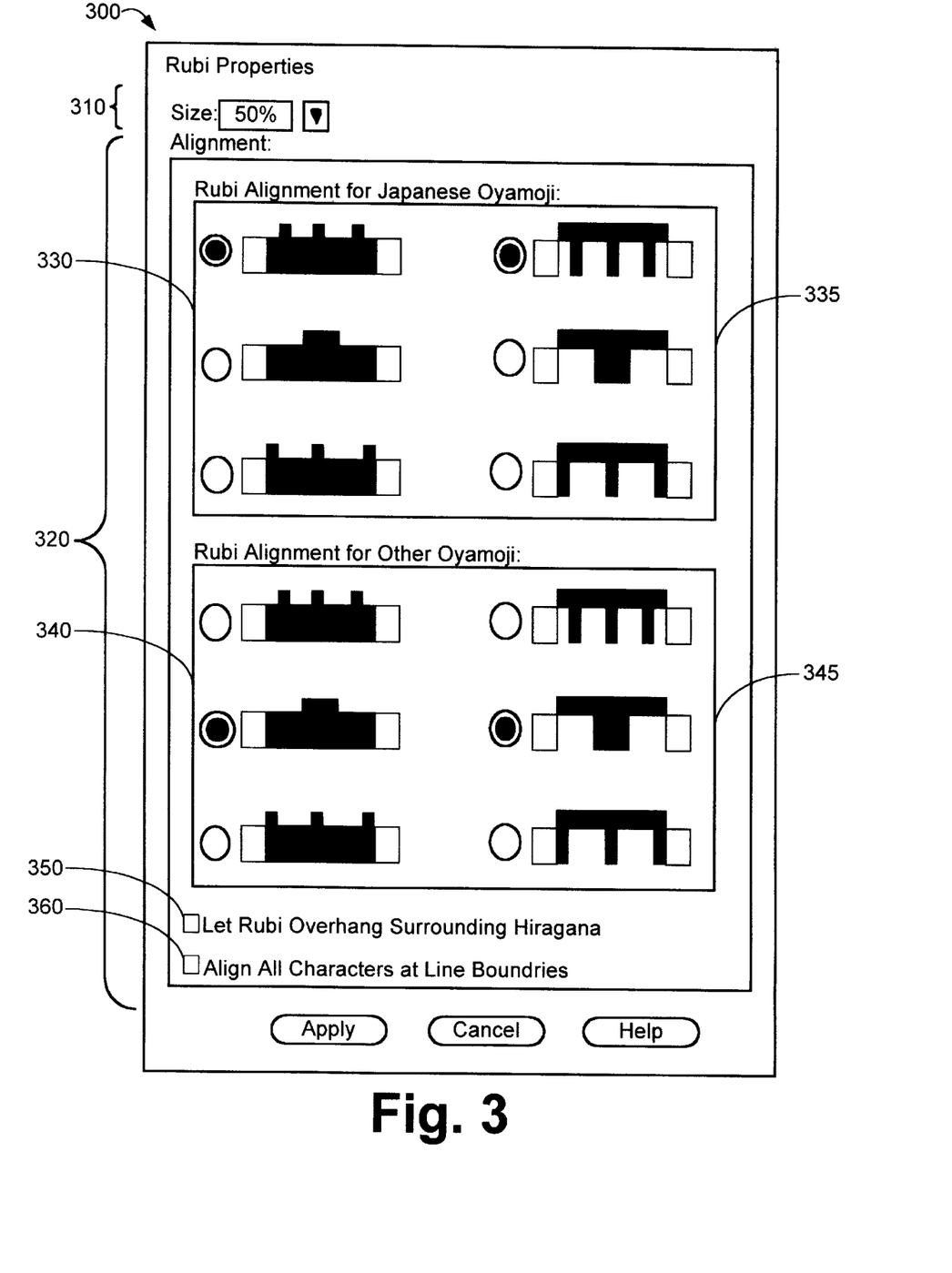
FIG. 3 shows a user interface for setting properties of a composite text unit.

Composite text properties may be defined in various ways. FIG. 3 shows an example of a dialog box 300 for setting composite text properties, allowing font size 310 to be specified as a percentage of the font size of the base text. Font size options may alternatively be specified as metric point sizes.

The options for a property such as font size may vary depending on the particular application. For example, the font size may be limited by external constraints, such as specification in the JIS guidelines of a permissible font size range. Font size may also be limited by internal practical constraints based on, for example, the character set of the annotation text or the line spacing of the text document.

Dialog box 300 also allows a user to choose from a variety of alignment options 320 for the annotation text string with base text string, taking into consideration the character sets of both the annotation and base text strings. For example, FIG. 3 provides alignment options for an annotation text string of rubi text with a base text string comprised of Japanese oyamoji characters as well as an annotation text string of rubi text with a base text string comprised of "other" oyamoji characters, which may be, for example, Roman characters. This allows the user to handle combinations of different texts differently.

Although FIG. 3 shows the same alignment options for both Japanese oyamoji and Other oyamwji, the specific alignment options may vary for different combinations of base and annotation character sets.

For the alignment sets 330, 335, 340, 345, if the natural width (the width of a text string as it would appear without additional spacing inserted) of the annotation text string and base text string are equal, the annotation text string will simply be printed above the base text string and no alignment rule is applied.

When the annotation text string and base text string are of different widths, the dialog box 300 of FIG. 3 provides two sets of options in two columns: the left column (330, 340) presents options when the natural width of the annotation text string is less than the natural width of the base text string; the right column (335, 345) presents options when the natural width of the annotation text string is greater than the natural width of the base text string.

Figure 4:
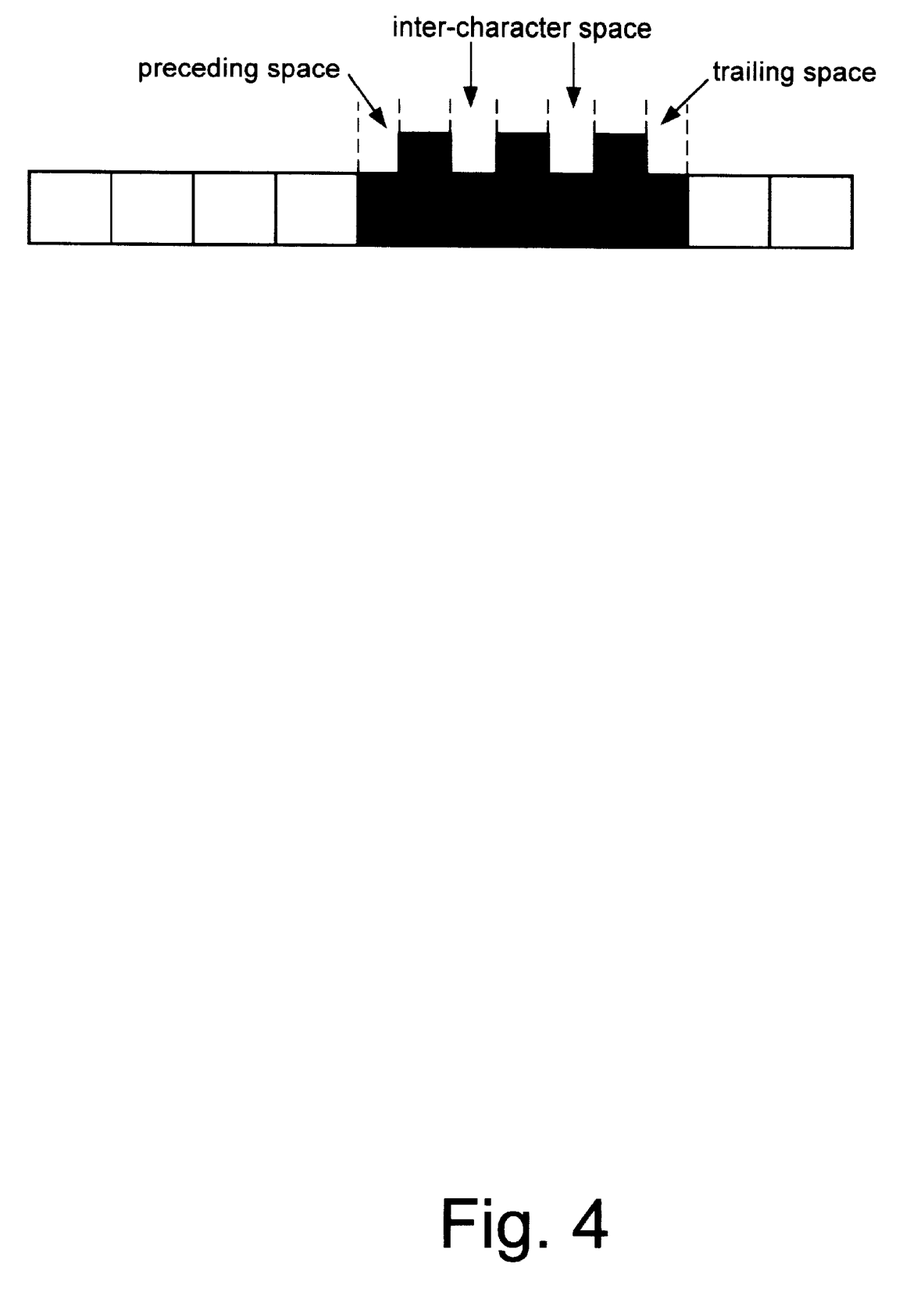
FIG. 4 illustrates an alignment option for a composite text unit.

Referring to sets 330 and 335 (which are respectively identical to sets 340 and 345) the first option of each set inserts preceding, inter-character, and trailing spaces in the text string of narrower width, in the proportions of 1:2:1, illustrated in greater detail in FIG. 4. The specific size of a standard spacing unit will depend on the widths of the annotation and base text strings and the widths of individual characters within the text strings.

For example, assume the following variables for a composite text unit:

| | |
|---|---|
| $W_a$ | total natural width of annotation text string |
| $W_b$ | total natural width of base text string |
| $W_s = \|W_a - W_b\|$ | total width of space to be inserted |
| $n_a$ | number of characters in annotation text string |
| $n_b$ | number of characters in base text string |
| $n_s$ | total number of spacing units to be inserted |
| $w_s = W_s / n_s$ | width occupied by a single spacing unit |

If the annotation text string has a greater width than the base text string, $W_a > W_b$, and space is inserted in the base text string. The number of spacing units $n_s$ (one spacing unit in a preceding space, two spacing units in each inter-character space, and one spacing unit in a trailing space) is equal to $2*n_b$.

If the annotation text string has a smaller width than the base text string, $W_a < W_b$, and space is inserted in the annotation text string. $n_s$ is equal to $2*n_a$.

In either case, the width of a standard spacing unit $w_s$ is calculated, and spaces of appropriate widths can be calculated and inserted.

The second option of each set is center justified, centering the text string of narrower width without inserting inter-character spaces.

The third option of each set is full justified, aligning the ends of the base and annotation text strings. Spaces of equal width are calculated and inserted between the characters of the narrower text string.

Dialog box 300 also provides an overhang feature 350 used when the annotation text string has a greater width than the base text string. The overhang feature 350 inserts less space into the base text string and allows the annotation text string to slightly extend beyond (or overhang) the ends of the base text string.

Figure 5:
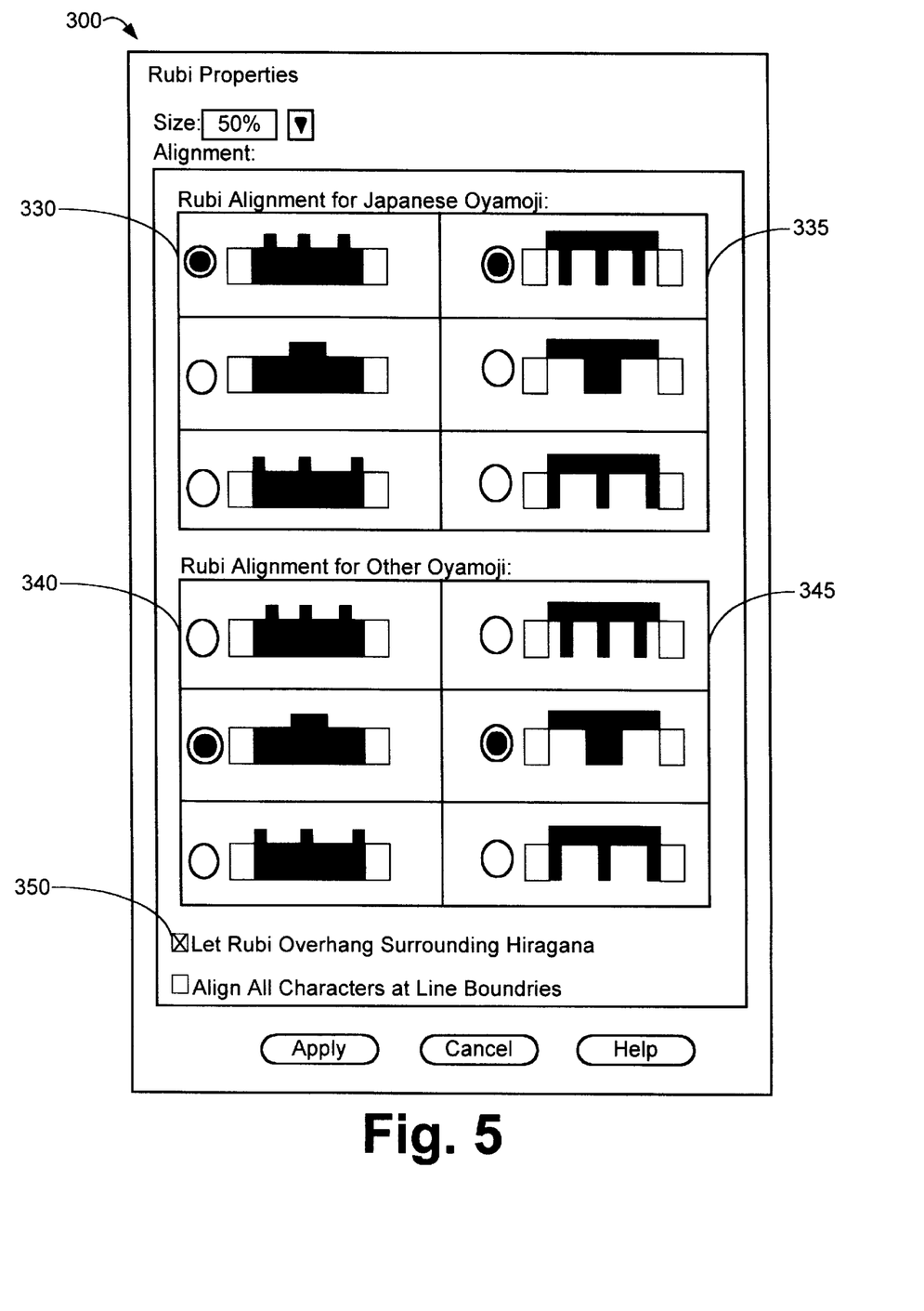
FIG. 5 shows a user interface for setting composite text properties.

FIG. 5 illustrates possible modifications to alignment options when the annotation text string is wider than the base text string (335', 345'), resulting from selection of the overhang feature 350. As shown, if the annotation text string is not wider than the base text string (330', 340'), selection of the overhang feature 350 has no effect.

In this example, the annotation text string overhangs the text surrounding the base text string by half the width of the left-most and right-most characters of the annotation text string. The amount of overhang may vary. For example, rules may be provided to vary the overhang based on the difference in widths of the annotation and base text strings. Different rules may be provided to apply when the composite text unit falls at a line boundary (discussed below), or, for example, when the text is written vertically rather than horizontally.

Figure 6:
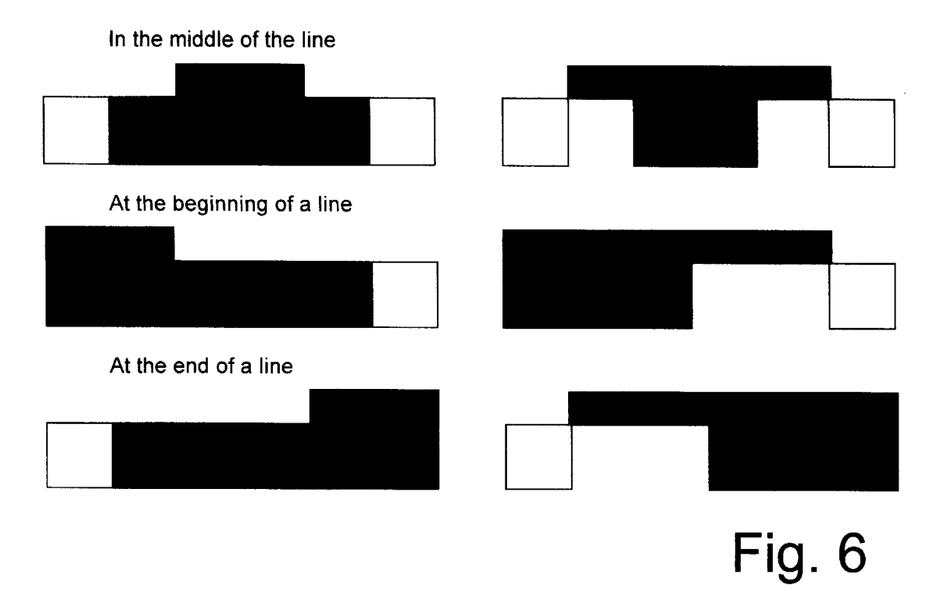
FIG. 6 shows alignment variations for a composite text unit.

Dialog box 300 of FIG. 3 also provides a line boundary alignment option 360, which varies the alignment options when a composite text unit occurs at a line boundary (i.e., the beginning or end of a line). The variations may simply be modifications of the general options 330, 335, 340, 345. For example, FIG. 6 illustrates possible variations for the second options of sets 330 and 335 with the line boundary alignment option 360 set.

Figure 7A:
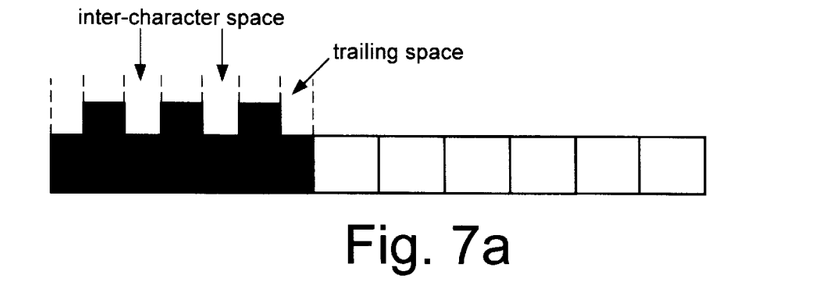
FIGS. 7a and 7b show additional alignment options for a composite text unit occurring at a line boundary.
Figure 7B:
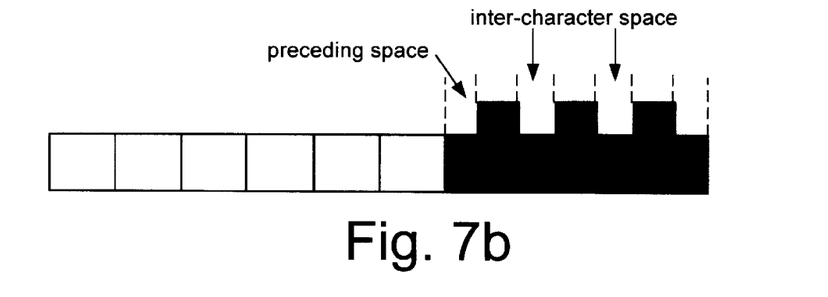

Alternatively, the variations may use a different spacing method. For example, rather than the 1:2:1 spacing described above and illustrated in FIG. 4, FIG. 7a shows left justification of the narrower text string when the composite text unit occurs at the beginning of a line, inserting equal spaces for inter-character and trailing spaces. FIG. 7b shows a corresponding option, right justifying the narrower text string when the composite text unit occurs at the end of a line.

Additional options may be provided for composite text units occurring at a line boundary. For example, a rule may be that when the overhang feature 350 and line boundary alignment option 360 are both selected, overhang is not used on the side of the composite aligned with the line boundary.

Figure 8:
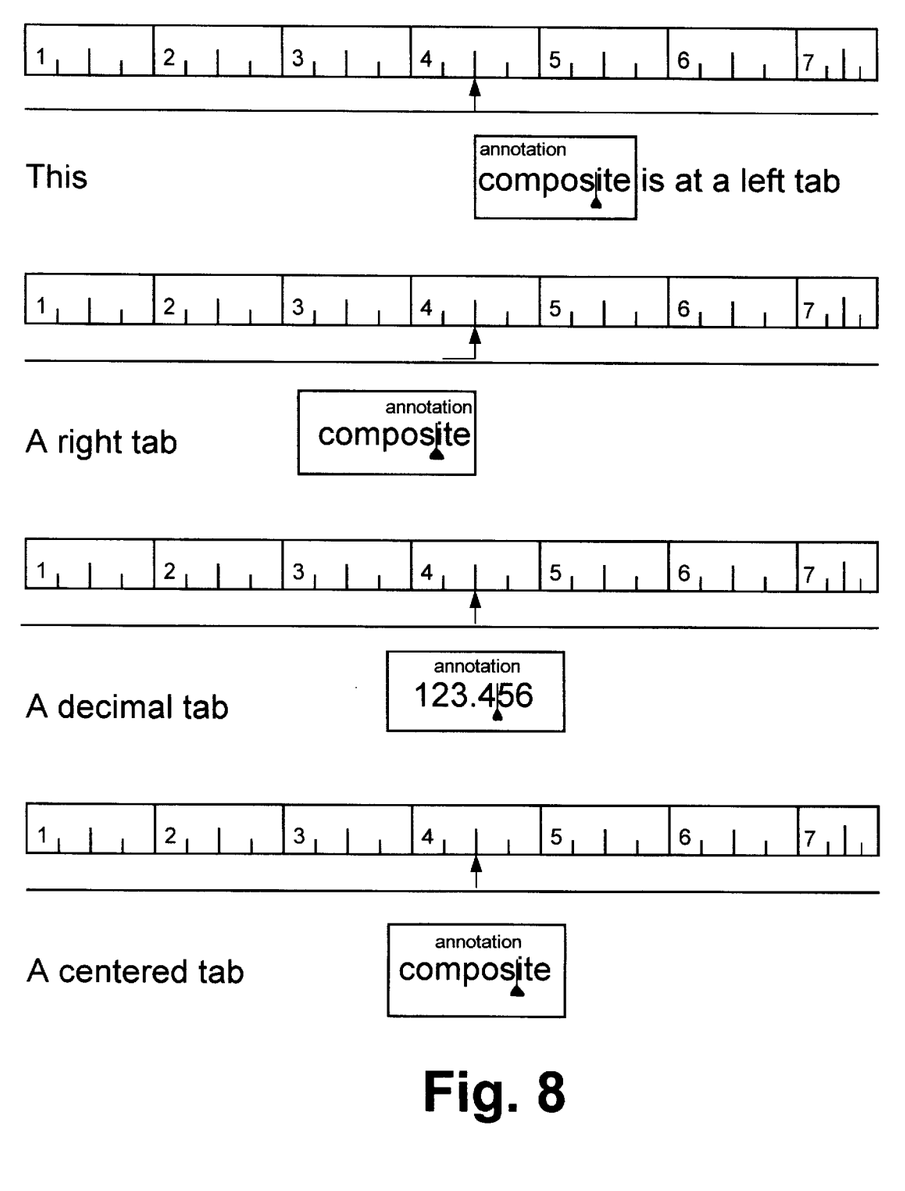
FIG. 8 shows formatting options for a composite text unit following a tab.

In addition to the composite text properties set by a user, other formatting rules may be implemented. For example, the JIS guideline requirement discussed above, requiring that a composite text unit occur on a single line may be implemented. Additional formatting rules may include, for example, rules for handling tabs imbedded in either the base or annotation text strings of a composite text unit, rules for handling tabs occurring just prior to the composite text unit, handling superscript and subscript text, and handling footnotes within a composite text unit. FIG. 8 illustrates examples showing how a composite text unit immediately following different types of tabs may be handled.

As a user inputs characters of an annotation text string (step 230), the characters appear directly in the screen display of the document in accordance with the set composite text properties and other predefined formatting rules (step 240). This provides real time feedback to enable the user to view the annotation text string as it will appear in the document when rendered or output. Alternative viewing options, such as providing a dialog box with an enlarged view of the composite text unit, may also be provided.

The appearance of a composite text unit may be modified as desired. In the examples provided, an annotation text string is displayed in a smaller font size directly above its corresponding base text string. As an example of an alternative, in traditional Japanese text in which the base text string is displayed vertically, annotation text string may be displayed vertically on either side of the base text string.

Figure 9A:
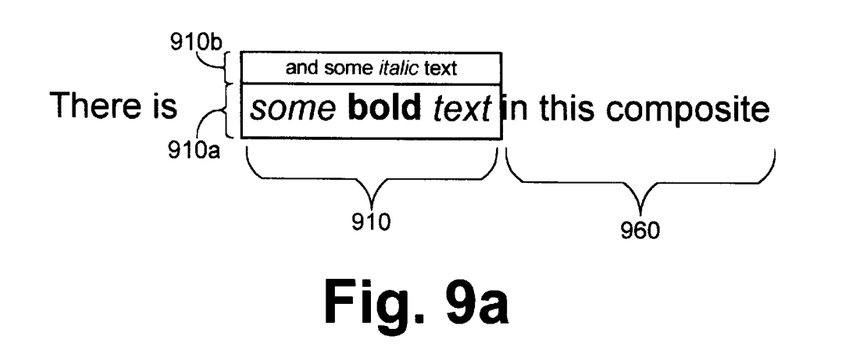
FIG. 9a shows a sentence including a composite text unit.
Figure 9B:
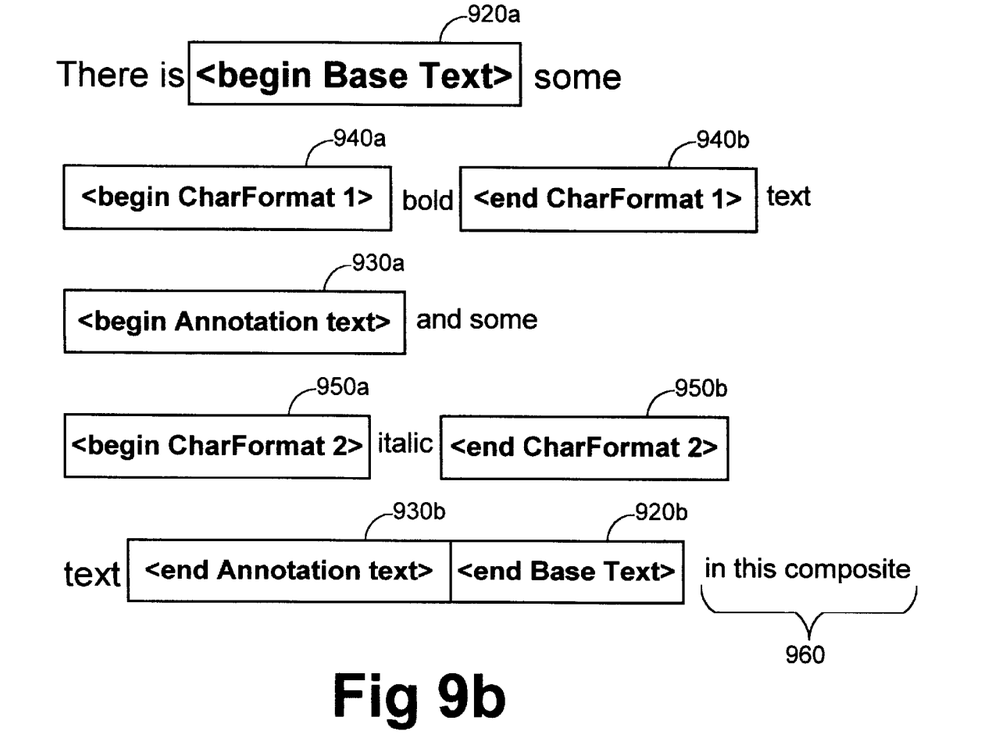

FIG. 9a illustrates a composite text unit 910 within a sentence, and FIG. 9b illustrates a possible internal representation of the sentence. FIG. 9b represents the beginning and end of composite and annotation text strings using formatting codes 920a, 920b, 930a, 930b. Specifically, 920a and 920b respectively designate the beginning and end of a composite text unit 910, and 930a and 930b respectively designate the beginning and end of an annotation text string 910b.

FIG. 9a also illustrates that segments within a composite text unit may be formatted. The bold word in the base text string and italic word in the annotation text string may be represented using an implementation such as that illustrated in FIG. 9b by inserting formatting codes at appropriate positions within the sentence. In this example, charformat1 (940a, 940b) specifies bold and charformat2 (950a, 950b) specifies italic. Similar formatting codes may be inserted for other formatting variations such as size, angle weight, color, spread, subscript, superscript, and pair kerning.

Once generated, a composite text unit may be freely edited. Edits are also displayed as they are entered in accordance with the composite text properties and applicable formatting rules.

Figure 10A:
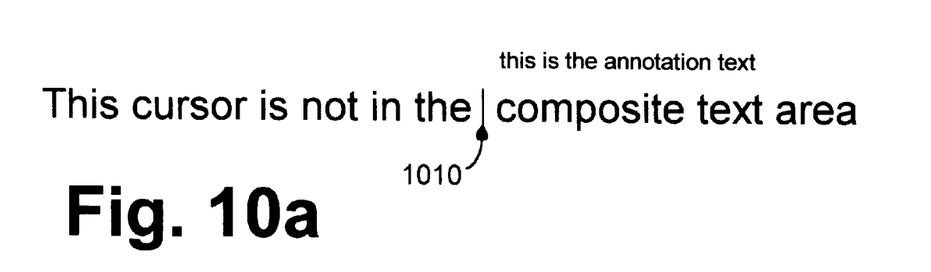
FIGS. 10a–10c and 11a–11c show a sentence including a composite text unit during editing.
Figure 10B:
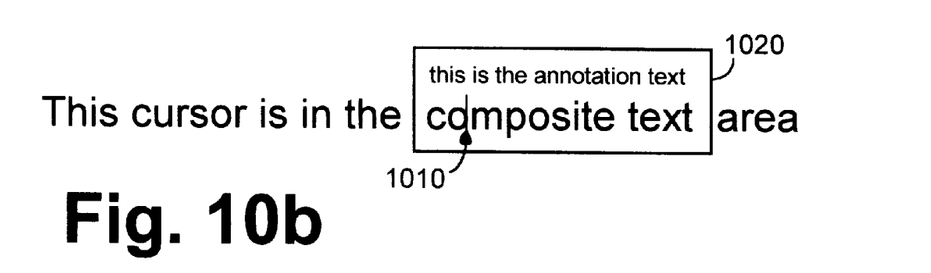
Figure 10C:
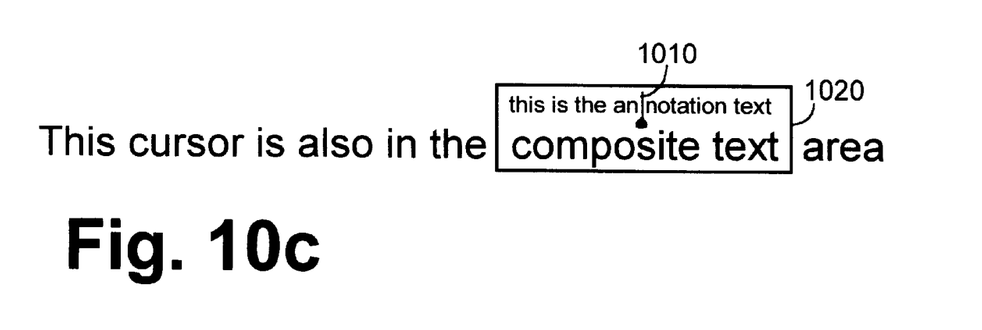

Editing methods may vary. Word processing programs generally have a user-positioned insertion point in the text displayed as a cursor position 1010, as shown in FIGS. 10a–10c. To edit a composite text unit, the cursor position may be positioned within either the base or annotation text strings. Using the implementation shown in FIGS. 9a and 9b, the composite text unit may be edited when the cursor is positioned after the format code marking the beginning of the composite text unit 920a and before corresponding format code 920b. As the user forwards the cursor, the cursor position moves through the base text string 910a of the composite text unit, and after passing the last character in the base text string 910a, moves to the first character of the annotation text string 910b rather to the text 960 following the composite text unit 910.

FIG. 10 illustrates text as it appears using a user interface that displays a bounding box 1020 around a composite text unit when the cursor position 1010 is within the composite text unit. Displaying the bounding box 1020 avoids user ambiguity as to whether the text to be edited is standard or composite text. While the cursor position 1010 is outside the composite text unit as in FIG. 10a, the bounding box is not displayed. Only when the cursor position 1010 moves within the composite text unit, either within the base text string as shown in FIG. 10b or the annotation text string as shown in FIG. 10c, is the bounding box 1020 displayed. Referring to the example of FIG. 9b, the bounding box is displayed while the cursor is positioned between format codes 920a and 920b.

As a composite text unit is modified, its display maintains previously set composite text properties.

Instead of providing a bounding box, other methods of emphasizing the composite text unit, such as highlighting, may be used. Further, a dialog box may be provided for editing an annotation text string. For example, if the font of the annotation text string is very small and difficult to display or view, the application may provide a viewing option to the user to open a dialog box for editing the annotation text string, providing an enlarged display of the composite text unit.

Figure 11A:
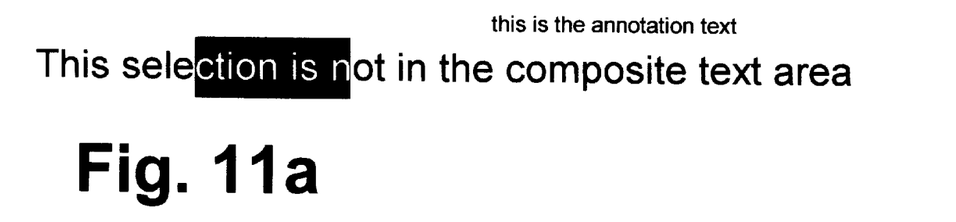
Figure 11B:
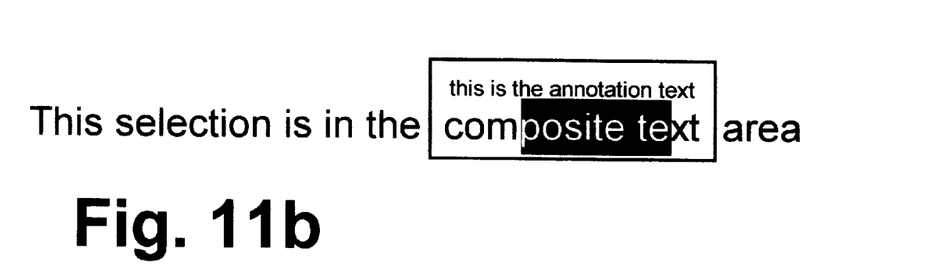
Figure 11C:
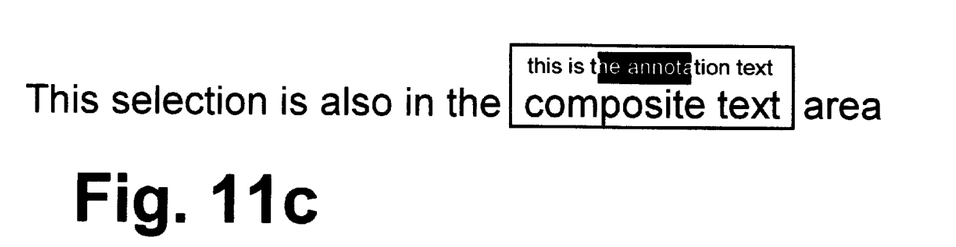

As an alternative to editing or formatting a composite text unit character by character, a user may select a portion of the annotation or base text strings and reformat the selected portion. Word processing applications generally allow a user to select a string of text, as shown in FIG. 11a, for editing. In FIG. 11a, the selection is outside the composite text unit. The user may also select a string of text within the composite text unit, either within the base text string as shown in FIG. 11b, or within the annotation text string as shown in FIG. 11c. Selection may be used, for example, to reformat a word to be in bold or italics, as shown in the composite text unit 910 of FIGS. 9a and 9b.

The invention may be implemented in hardware or software, or a combination of both. Preferably, the invention is implemented in a software program executing on a programmable processing system comprising a processor, a data storage system, an input device, and an output device.

Figure 12:
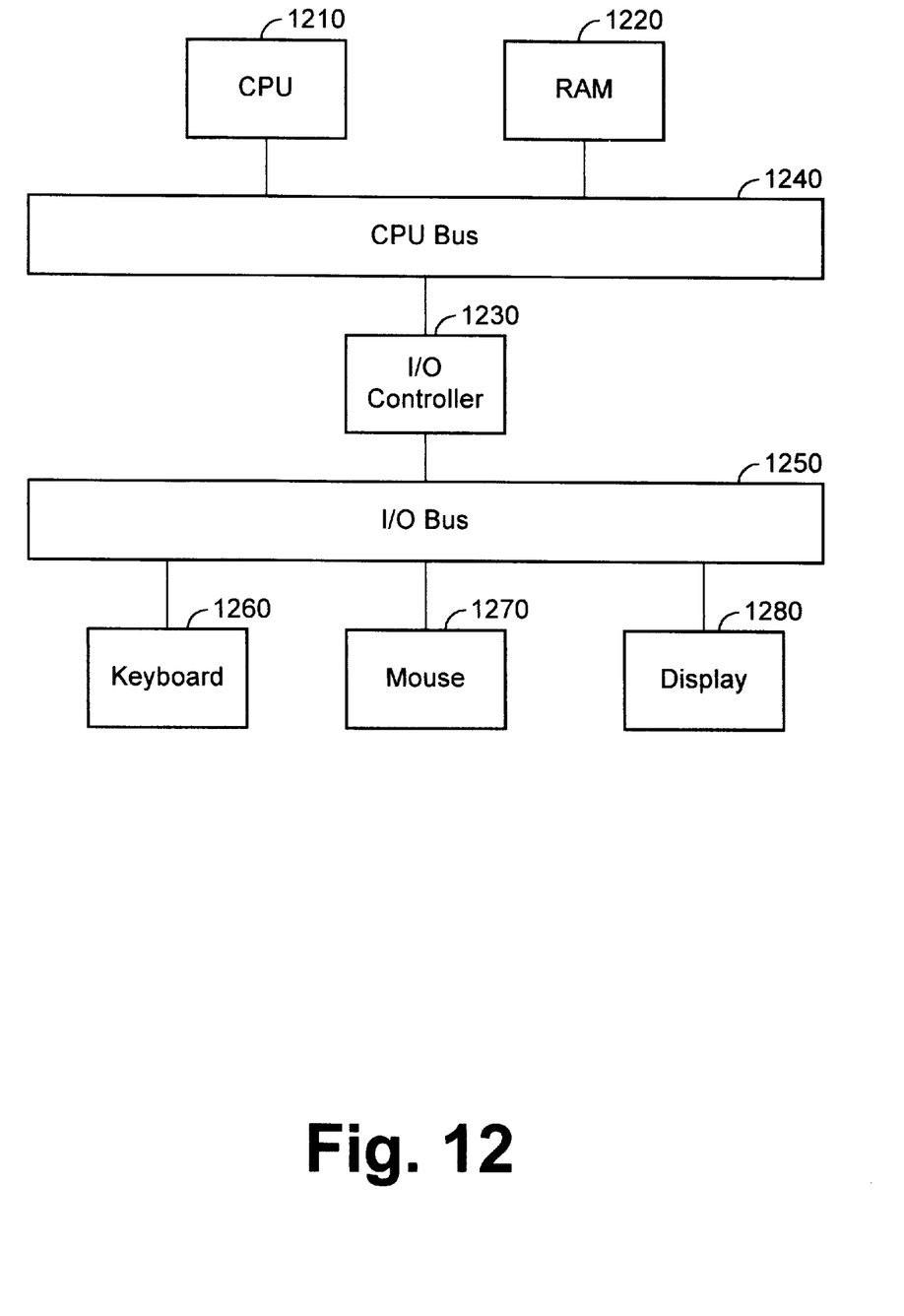
FIG. 12 shows a computer system.

FIG. 12 illustrates one such programmable processing system 1200, including a CPU 1210, a RAM 1220, and an I/O controller 1230 coupled by a CPU bus 1240. The I/O controller 1230 is also coupled by an I/O bus 1250 to input devices such as a keyboard 1260 and mouse 1270, and output devices such as a display 1280.

Other embodiments are within the scope of the following claims. For example, a user may reset the composite text properties each time a new composite text unit is created. Alternatively, the user may set the composite text properties once, and those properties will be applied to each composite text unit created thereafter until the properties are changed.

As another variation, various character sets may be used for characters of the base and annotation text. The annotation text string may be printed in a different position relative to the base text string. For example, instead of being printed above the base text string, the annotation text string may be printed below the base text string. Or, if the base text string is written vertically, the annotation text string would more naturally be printed vertically alongside the base text string.

Various formatting rules may be provided as needed for specific applications. For example, the rule that composite text unit must be printed on the same line may not hold true for text not subject to the JIS guidelines. Similarly, the precise spacing rules may vary depending on the character set.

What is claimed is:

1. A computer-implemented method to embellish text in a document, comprising:
    setting composite text properties for formatting a composite text unit, the composite text unit including an annotation text string and a base text string, wherein the annotation text string includes one or more annotation characters and the base text string includes one or more base characters, the set of composite text properties defining and linking the appearance and the positioning of the annotation text string and the base text string including specifying a rule that relates the formatting of the annotation characters to the formatting of the base characters, where an appearance composite text property defines a font to be used for both the annotation text string and the base text string and the rule specifies a relationship between a font size of the annotation text string and the base text string;
    selecting text in a displayed text document as the base text string for the composite text unit;
    generating text as the annotation text string for the composite text unit; and
    displaying the composite text unit in the document in accordance with the composite text properties.

2. The method of claim 1, wherein the text selected for the base text string is comprised of Japanese characters.

3. The method of claim 1, wherein the text of the annotation text string provides pronunciation information for the text of the base text string.

4. The method of claim 1, wherein the text of the annotation text string provides semantic information for the text of the base text string.

5. The method of claim 1, wherein setting composite text properties includes determining a character set for the annotation text string.

6. The method of claim 1, wherein setting composite text properties includes determining a font for the annotation text string.

7. The method of claim 1, wherein setting composite text properties includes determining a font size for the annotation text string.

8. The method of claim 1, wherein setting composite text properties includes determining alignment options for the annotation text string with the base text string.

9. The method of claim 8, wherein determining alignment options includes determining separate alignment options for a composite text unit occurring at a line boundary in the text document.

10. The method of claim 8, wherein determining alignment options includes determining an overhang option.

11. The method of claim 1, wherein the annotation text string comprises a string of more than one character.

12. The method of claim 1, wherein the composite text unit in the text document is interactively displayed in accordance with the composite text properties as the text for the annotation text string is generated.

13. The method of claim 1, wherein displaying the composite text unit in the text document displays the annotation text string above the base text string.

14. The method of claim 1, wherein displaying the composite text unit in the text document displays the annotation text string alongside the base text string.

15. The method of claim 1, wherein displaying the composite text unit in the text document displays characters of the annotation text string in a different font size than characters of the base text string.

16. The method of claim 1, wherein the composite text properties are set to default properties.

17. The method of claim 1, further comprising:
    editing the text of the composite text unit; and
    displaying the edited composite text unit in the text document in accordance with the composite text properties.

18. The method of claim 17, wherein the edited composite text unit is interactively displayed as it is edited.

19. The method of claim 17, further comprising emphasizing the displayed composite text unit as the composite text unit is edited.

20. The method of claim 19, wherein emphasizing the displayed composite text unit displays a bounding box around the composite text unit.

21. The method of claim 19, wherein emphasizing the displayed composite text unit highlights the displayed composite text unit.

22. The method of claim 17, wherein editing the text of the composite text unit further comprises reformatting at least a portion of the annotation text string.

23. The method of claim 17, wherein editing the text of the composite text unit further comprises:
   selecting a portion of the annotation text string; and
   reformatting the selected portion of the annotation text string.

24. The method of claim 23, wherein editing the text of the composite text unit further comprises:
   editing the annotation text string.

25. The method of claim 23, wherein editing the text of the composite text unit further comprises:
   editing the base text string.

26. A computer-implemented method for editing a composite text unit in a document, the composite text unit including a base text string and an annotation text string, the method comprising:
   displaying, in accordance with predetermined composite text properties, a text document including a base text string and an annotation text string of the composite text unit, the base text string including one or more base characters and the annotation text string including one or more annotation characters, wherein the predetermined composite text properties define and link the appearance and the positioning of the annotation text string and the base text string including specifying a rule that relates the formatting of the annotation characters to the formatting of the base characters;
   displaying a cursor in the displayed text document;
   moving the cursor within the displayed annotation text string, wherein a position of the cursor is based on user input;
   editing an appearance of the annotation text string at the cursor position in response to user input including editing a composite text property;
   automatically editing the appearance of the base text string in response to the editing of the composite text property without having to individually edit the base text string; and
   displaying the text document.

27. The method of claim 25, further comprising:
   emphasizing a composite text unit when the cursor position is within the composite text unit; but
   not emphasizing the composite text unit when the cursor position is not within the composite text unit.

28. The method of claim 27, wherein the composite text unit is emphasized by displaying a bounding box around the composite text unit.

29. The method of claim 27, wherein the composite text unit is emphasized by highlighting the composite text unit.

30. The method of claim 26, wherein the cursor is freely movable within the composite text unit for editing the base text string and the annotation text string.

31. A memory device storing computer-readable instructions for aiding a computer to embellish text in a text document comprising:
   instructions for defining, in response to user input, a first text string as a base text string of a composite text unit, the base text string including one or more base characters;
   instructions for defining, in response to user input, a second text string as an annotation text string of the composite text unit, the annotation text string including one or more annotation characters; and
   instructions for defining, in response to user input, composite text properties for defining the display of the composite text unit, wherein the composite text properties define and link the appearance and the positioning of the annotation text string and the base text string including specifying a rule that relates the formatting of the annotation characters to the formatting of the base characters where an appearance composite text property defines a font to be used for both the annotation text string and the base text string and the rule specifies a relationship between a font size of the font used in the annotation text string and the font used in the base text string.

32. A method for editing a composite text unit in a document, the composite text unit including a base text string and an associated annotation text string, the composite text unit having composite text properties, wherein the base text string includes one or more base characters and the annotation text string includes one or more annotation characters, the method comprising:
   displaying the composite text unit in context in a display of the document, the composite text unit being displayed in accordance with the composite text properties, wherein the composite text properties define and link the appearance and the positioning of the annotation text string and the base text string including specifying a rule that relates the formatting of the annotation characters to the formatting of the base characters;
   receiving from a user editing commands to be applied to the annotation text string displayed as part of the composite text unit in the display of the document, the editing commands including instructions for changing a formatting of the annotation text string; and
   editing the annotation text string in response to the editing commands while maintaining a relationship between the formatting of the annotation text string with the base text string in the composite text unit as defined by the composite text properties, the editing step including automatically editing the base text string to maintain the relationship between the formatting of the two strings; and
   continuing to display the composite text unit in accordance with the composite text properties.

33. The method of claim 32, wherein the base text is oyamoji and the annotation text is rubi.

34. A method for editing a composite text unit in a document, the composite text unit including a base text string and an associated annotation text string, the composite text unit having composite text properties, wherein the base text string includes one or more base characters and the annotation text string includes one or more annotation characters, the method comprising:
   displaying the composite text unit in context in a display of the document, the composite text unit being displayed in accordance with the composite text properties, wherein the composite text properties define and link the appearance and the positioning of the annotation text string and the base text string including specifying a rule that relates the formatting of the annotation characters to the formatting of the base characters;
   receiving from a user editing commands applied to the base text string displayed as part of the composite text unit in the display of the document, the editing commands including instructions for changing a formatting of the base text string; and editing the base text string in response to the editing commands while maintaining a relationship between the formatting of the annotation text string with the base text string in the composite text unit as defined by the composite text properties, the editing step including automatically editing the annotation text string to maintain the relationship between the formatting of the two strings; and continuing to display the composite text unit in accordance with the composite text properties.

35. The method of claim 34, wherein the base text is oyamoji and the annotation text is rubi.

* * * * *